(12) United States Patent
Tsirkin et al.

(10) Patent No.: US 10,140,214 B2
(45) Date of Patent: Nov. 27, 2018

(54) HYPERVISOR TRANSLATION BYPASS BY HOST IOMMU WITH VIRTUAL MACHINE MIGRATION SUPPORT

(71) Applicant: Red Hat Israel, Ltd., Ra'anana (IL)

(72) Inventors: Michael Tsirkin, Westford, MA (US); Amnon Ilan, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 2 days.

(21) Appl. No.: 15/250,335

(22) Filed: Aug. 29, 2016

(65) Prior Publication Data

US 2018/0060245 A1   Mar. 1, 2018

(51) Int. Cl.
*G06F 3/06* (2006.01)
*G06F 12/10* (2016.01)
*G06F 9/455* (2018.01)

(52) U.S. Cl.
CPC .............. *G06F 12/10* (2013.01); *G06F 3/061* (2013.01); *G06F 3/0605* (2013.01); *G06F 3/0647* (2013.01); *G06F 3/0659* (2013.01); *G06F 3/0664* (2013.01); *G06F 3/0673* (2013.01); *G06F 9/45558* (2013.01); *G06F 2009/45579* (2013.01); *G06F 2009/45583* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 8,146,082 B2 | 3/2012 | Belay | |
| 8,631,212 B2 | 1/2014 | Kegel et al. | |
| 8,650,337 B2 | 2/2014 | Craddock et al. | |
| 9,122,594 B2 | 9/2015 | Mahalingam et al. | |
| 9,176,767 B2 | 11/2015 | Cantu | |
| 9,208,103 B2 | 12/2015 | Kessler et al. | |
| 10,025,615 B2 * | 7/2018 | Tsirkin | G06F 9/45558 |
| 2005/0235123 A1 * | 10/2005 | Zimmer | G06F 9/5016 711/170 |
| 2012/0265916 A1 * | 10/2012 | Nordstrom | G06F 13/28 710/308 |
| 2014/0068137 A1 | 3/2014 | Kegal et al. | |
| 2014/0189690 A1 | 7/2014 | Ramakrishnan Nair | |
| 2014/0359267 A1 * | 12/2014 | Moriki | G06F 9/441 713/2 |

OTHER PUBLICATIONS

Liu et al., Research on Hardware I/O Passthrough in Computer Virtualization, Proceedings of the Third International Symposium on Computer Science and Computational Technology, Jiaozuo, P.R. China, Aug. 14-15, 2010, pp. 353-356.
Ben-Yehuda, Muli, Bare-Metal Performance for x86 I/O Virtualization, Technion & IBM Research, Nov. 2011, Link: http://www.mulix.org/lectures/bare-metal-perf/bare-metal.pdf (23 pages).

* cited by examiner

*Primary Examiner* — Edward J Dudek, Jr.
(74) *Attorney, Agent, or Firm* — K&L Gates LLP

(57) ABSTRACT

A system and method of translation bypass includes a hypervisor configuring a host input-output memory management unit to translate a guest memory of a guest virtual machine. The hypervisor reserves a first portion of the guest memory. The hypervisor receives, from the guest virtual machine, a guest physical address. The hypervisor stores the guest physical address in the first portion of the guest memory. The hypervisor configures a device to access the first portion of the guest memory to locate a command.

20 Claims, 6 Drawing Sheets

HYPERVISOR TRANSLATION BYPASS BY HOST IOMMU WITH VIRTUAL MACHINE MIGRATION SUPPORT

BACKGROUND

Virtualization may be used to provide some physical components as logical objects in order to allow running various software modules, for example, multiple operating systems, concurrently and in isolation from other software modules, on one or more interconnected physical computer systems. Virtualization may allow, for example, for consolidating multiple physical servers into one physical server running multiple guest virtual machines in order to improve the hardware utilization rate.

Virtualization may be achieved by running a software layer, often referred to as a hypervisor, above the hardware and below the guest virtual machines. A hypervisor may run directly on the server hardware without an operating system beneath it or as an application running on a traditional operating system. A hypervisor may virtualize the physical layer and provide interfaces between the underlying hardware and guest virtual machines. Processor virtualization may be implemented by the hypervisor scheduling time slots on one or more physical processors for a guest virtual machine, rather than a guest virtual machine actually having a dedicated physical processor.

SUMMARY

The present disclosure provides new and innovative methods and systems for hypervisor translation bypass. An example method includes configuring, by a hypervisor, a host input-output memory management unit to translate a guest memory of a guest virtual machine. The hypervisor reserves a first portion of the guest memory. The hypervisor receives, from the guest virtual machine, a guest physical address. The hypervisor stores the guest physical address in the first portion of the guest memory. The hypervisor configures a device to access the first portion of the guest memory to locate a command.

Additional features and advantages of the disclosed methods and system are described in, and will be apparent from, the following Detailed Description and the Figures.

DETAILED DESCRIPTION OF EXAMPLE EMBODIMENTS

In computer systems executing a guest virtual machine, a hypervisor may typically receive a request to the guest virtual machine from a device. This request is then executed on behalf of the guest virtual machine. For example, a request to transmit or receive packets of information is executed on behalf of the guest virtual machine. Typically, requests are in guest memory and are passed by the guest virtual machine using a guest address (e.g., guest physical address).

To execute the request on behalf of the guest virtual machine, the hypervisor typically translates a guest physical address to a host address, and then accesses the request through the host address. However, the above discussed translation adds significant overhead on the part of the hypervisor, especially for applications involving network function virtualization, which may deal with a large amount of access requests involving a small amount of processing resources for each access request. For example, a great deal of requests to transmit and/or receive packets of information may be received (e.g., at speeds above 10 GB/s), where each request provides minimal information; so, reducing overhead caused by guest address translation via hypervisor (e.g., bypassing hypervisor translation) may provide a significant advantage.

By reserving a range of guest physical addresses, the system may be configured for hypervisor translation bypass. More particularly, the hypervisor may configure a host input-output memory management unit to translate addresses and handle device access requests, for example, so the hypervisor does not have to translate addresses and handle device access requests. By bypassing hypervisor translation, the hypervisor has additional processing resources to execute more requests on behalf of guest virtual machines. Additionally, because bypassing translation provides for increased computing performance, for example, the hypervisor has additional processing resources to allow more guest virtual machines to execute on a given host without negatively affecting performance. The present disclosure describes advantageous systems and methods for hypervisor translation bypass to reduce overhead and increase efficiency of network function virtualization applications.

Figure 1:
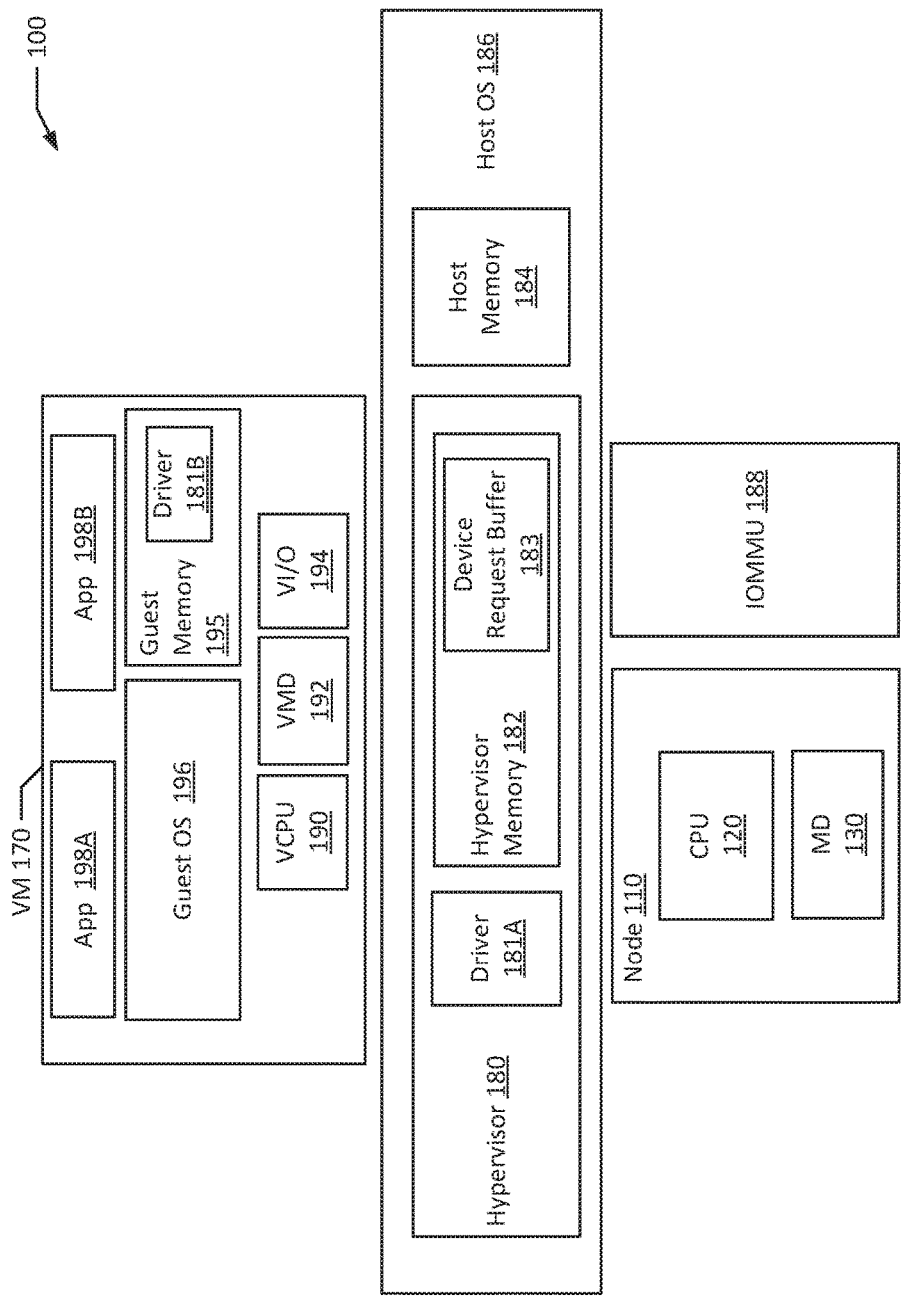
FIG. 1 is a block diagram of an example multi-processor computer system according to an example of the present disclosure.

FIG. 1 depicts a high-level component diagram of an example multi-processor computer system 100 in accordance with one or more aspects of the present disclosure. The computer system 100 may include one or more interconnected nodes 110. Each node 110 may in turn include one or more physical processors (e.g., CPU 120) communicatively coupled to memory devices (e.g., MD 130). In an example, the one or more physical processors (e.g., CPU 120) may be communicatively coupled to other input/output devices. Likewise, in an example, nodes may include a hardware device. In an example, a hardware device may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor (e.g., CPU 120) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130 refers to a volatile or non-volatile memory device, such as RAM, ROM, EEPROM, or any other device capable of storing data. As discussed herein, an input/output device refers to a device capable of providing an interface between one or more processors and an external device. The external device's operation is based on the processor inputting and/or outputting data.

Processor 120 may be interconnected to additional processors using a variety of techniques, ranging from a point-to-point processor interconnect to a system area network, such as an Ethernet-based network. Local connections within each node 110, including the connections between a processor 120 and a memory device 130, between a processor 120 and an input/output device, etc., may be provided by one or more local buses of suitable architecture, for example, peripheral component interconnect (PCI). As used herein, a device of the host operating system (host OS) 186 (or host device) may refer to CPU 120, MD 130, an input/output device, a software device, and/or hardware device.

Computer system 100 may run at least one guest virtual machine (e.g., VM 170), by executing a software layer (e.g., hypervisor 180) above the hardware and below the guest virtual machine 170, as schematically shown in FIG. 1. In an example, the hypervisor 180 may be a component of the host operating system 186 executed by the computer system 100. In another example, the hypervisor 180 may be provided by an application running on the host operating system 186. In another example, the hypervisor 180 may run directly on the computer system 100 without an operating system beneath it. For example, the hypervisor 180 may run directly on computer system 100, without host operating system 186 or host memory 184. The hypervisor 180 may virtualize the physical layer, including processors, memory, and input/output devices, and present this virtualization to the guest virtual machine 170 as devices, including a virtual processor (e.g., VCPU 190), virtual memory device (e.g., VMD 192), and/or virtual I/O device (e.g., VI/O 194, also referred generally to as virtual devices.

A guest virtual machine 170 may run on any type of dependent, independent, compatible, and/or incompatible applications on the underlying hardware and OS 186. In an example, applications (e.g., App 198A-B) run on a guest virtual machine 170 may be dependent on the underlying hardware and/or OS 186. In another example, applications 198A-B run on guest virtual machine 170 may be independent of the underlying hardware and/or OS 186. For example, applications 198A-B run on guest virtual machine 170 may be dependent on the underlying hardware and/or OS 186 while other applications run on a second guest virtual machine are independent of the underlying hardware and/or OS 186. Additionally, applications 198A-B run on the guest virtual machine 170 may be compatible with the underlying hardware and/or OS 186. In an example, applications 198A-B run on the guest virtual machine 170 may be incompatible with the underlying hardware and/or OS 186. For example, applications 198A-B run on the guest virtual machine 170 may be compatible with the underlying hardware and/or OS 186 while other applications run on a second guest virtual machine are incompatible with the underlying hardware and/or OS 186. In an example, a device may be implemented as a guest virtual machine 170.

In an example, a guest virtual machine 170 may execute a guest operating system (guest OS) 196, which may utilize the underlying VCPU 190, VMD 192, and VI/O device 194. One or more applications 198A-B may be running on a guest virtual machine 170 under the guest operating system 196. In an example, a guest virtual machine 170 may include multiple virtual processors. Processor virtualization may be implemented by the hypervisor 180 scheduling time slots on one or more physical processors 120 such that, from the guest operating system's perspective, those time slots are scheduled on a virtual processor 190.

The hypervisor 180 controls and limits access to memory (e.g., memory allocated to the guest virtual machine 170). For example, the hypervisor 180 controls and limits access to memory allocated to the guest operating system 196 of the guest virtual machine 170 (e.g., guest memory 195 allocated to guest operating system 196). For example, guest memory 195 may be divided into a plurality of memory pages. Access to these memory pages is controlled and limited by the hypervisor 180. For example, mappings to memory are managed by the hypervisor 180. Through these mappings, the memory itself can be accessed. Likewise, mappings may be used together with any paging data structure used by the guest virtual machine 170 to support translation from guest OS 196 to host OS 186 addresses (e.g., 32-bit linear address space using a two-level hierarchical paging structure, Physical Address Extension mode, INTEL® Extended Memory 64 Technology mode, etc.). Likewise, for example, guest memory 195 allocated to the guest operating system 196 is mapped from host memory 184 such that when a guest application 198A-B or a device (e.g., a virtual device 194, a hardware device, etc.) uses or accesses a memory page of guest memory 195 it is actually using or accessing host memory 184. Host memory 184 may also be referred to as host physical memory 184, as host physical memory 184 physically exists on hardware of a computer system (e.g., system 100). Mappings between guest memory 195 (e.g., guest physical addresses) and host memory 184 (e.g., host physical addresses) are stored, by the hypervisor 180, in the input-output memory management unit 188 (IOMMU). In an example, the input-output memory management unit 188 is referred to as a host input-output memory management unit, as it includes mappings to host memory 184.

Computer system 100 may further include drivers 181A-B. In an example, drivers 181A-B enable applications (e.g., applications 198A-B) to interact with devices (e.g., CPU 120, MD 130, an input/output device, a software device, a hardware device, etc.). For example, hypervisor 180 may include a driver 181A. In an example, the driver 181A is a device specific driver (e.g., a driver specific to any of a CPU 120, MD 130, an input/output device, a software device, a hardware device, etc.). Likewise, for example, guest memory 195 may include a driver 181B. In an example, the driver 181B is a generic driver (e.g., a driver not tied to any single device). Computer system 100 may further include a device request buffer 183 to receive access requests from devices (e.g., CPU 120, MD 130, an input/output device, a software device, a hardware device, etc.). For example, hypervisor 180 may include hypervisor memory 182, which may additionally include the device request buffer 183. Storing the device request buffer 183 in hypervisor memory 182 may provide, for example, better security associated with access requests received from devices. In an example, access requests (e.g., requests to access addresses) are stored in the device request buffer 183 without any modification.

Figure 2:
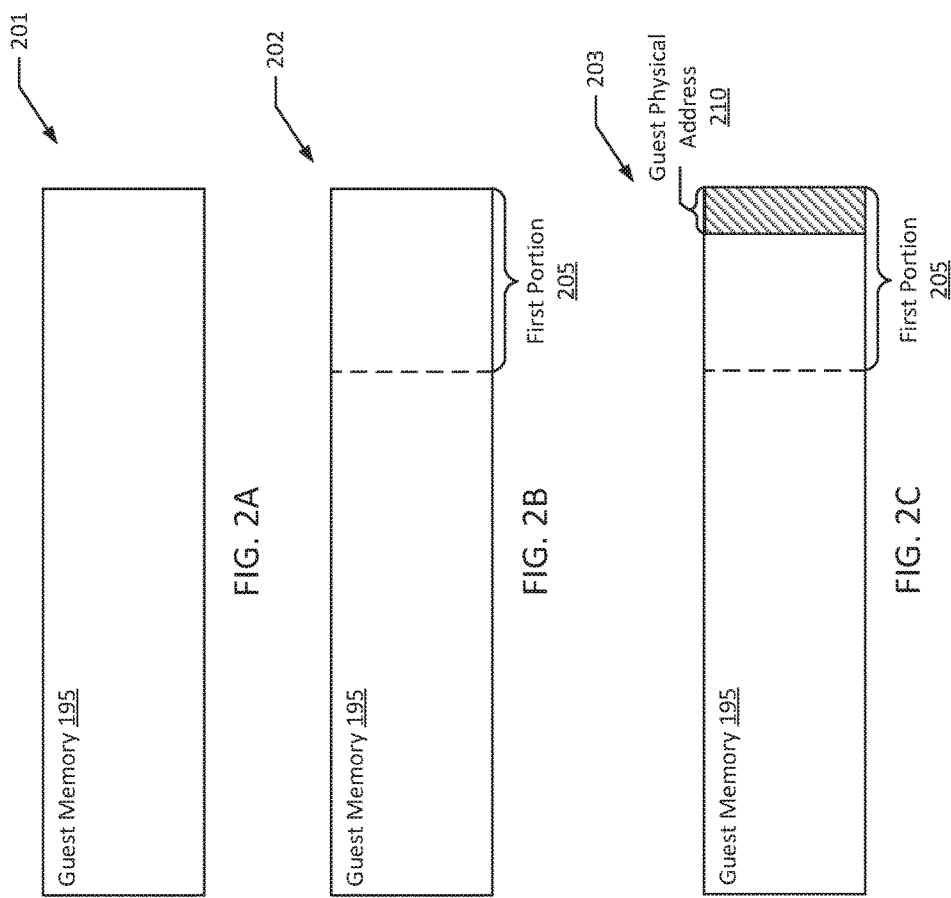
FIGS. 2A-C are block diagrams illustrating an example of reserving a portion of memory according to an example of the present disclosure.

FIGS. 2A-C are block diagrams illustrating an example of reserving a portion of memory according to an example of the present disclosure. FIG. 2A illustrates a first memory configuration 201. In the first memory configuration 201, a portion of guest memory 195 has not yet been reserved for hypervisor translation bypass. For example, the hypervisor 180 has not yet reserved a range of guest memory 195 (e.g., the first portion 205). FIG. 2B illustrates a second memory configuration 202. In the second memory configuration 202, a first portion 205 of guest memory 195 has been reserved by the hypervisor 180. For example, the hypervisor 180 has selected a range of guest memory 195 (e.g., the first portion 205) for hypervisor translation bypass. FIG. 2C illustrates a third memory configuration 203. In the third memory configuration 203, a guest physical address 210 (e.g., from guest memory 195) is stored in the first portion 205 of guest memory 195. In an example, the guest physical address 210 may be referred to as a guest physical handle. In an example, the first portion 205 of guest memory 195 is protected from guest virtual machine access (e.g., access by guest virtual machine 170). Therefore, for example, by storing the guest physical address 210 in the first portion 205 of guest memory 195, the guest physical address 210 is protected from access by guest virtual machine 170.

Figure 3:
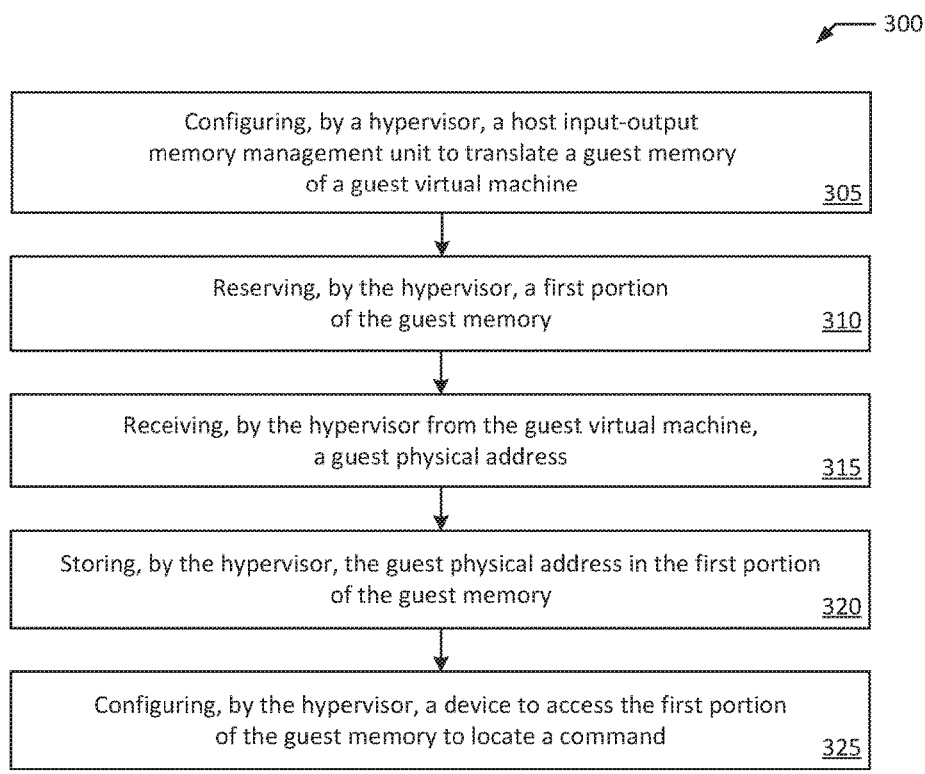
FIG. 3 is a flowchart illustrating an example method of translation bypass according to an example of the present disclosure.

FIG. 3 is a flowchart illustrating an example method of translation bypass according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described may be optional. The method 300 may be performed by processing logic that may include hardware (circuitry, dedicated logic, etc.), software, or a combination of both. For example, the method 300 may be performed by a hypervisor 180 interacting with guest virtual machine 170, host input-output memory management unit 188, and a device (e.g., CPU 120, MD 130, an input/output device, a software device, a hardware device, etc.).

The example method 300 starts with configuring a host input-output memory management unit (block 305). For example, hypervisor 180 configures host input-output memory management unit 188 to translate guest memory 195 of guest virtual machine 170. The example method 300 further includes reserving a first portion of the guest memory (block 310). For example, hypervisor 180 reserves first portion 205 of guest memory 195 (as depicted by FIGS. 2A-C and described above).

The example method 300 further includes receiving a guest physical address (block 315). For example, hypervisor 180 receives from guest virtual machine 170, a guest physical address 210. In an example, the guest physical address 210 is a physical address derived from guest memory 195. The example method 300 further includes storing the guest physical address in the guest memory (block 320). For example, hypervisor 180 stores the guest physical address 210 in the first portion 205 (e.g., the reserved portion) of guest memory 195. In an example, by storing the guest physical address 210 in the first portion 205 of guest memory 195, the guest physical address 210 is protected from access by guest virtual machine 170. The example method 300 further includes configuring the device to access the first portion of the guest memory to locate a command (block 325). In an example, the device (e.g., CPU 120, MD 130, an input/output device, a software device, a hardware device, etc.) accesses the first portion 205 (e.g., the reserved portion) of guest memory 195 to locate a command. For example, the command may include the guest physical address 210.

Figure 4A:
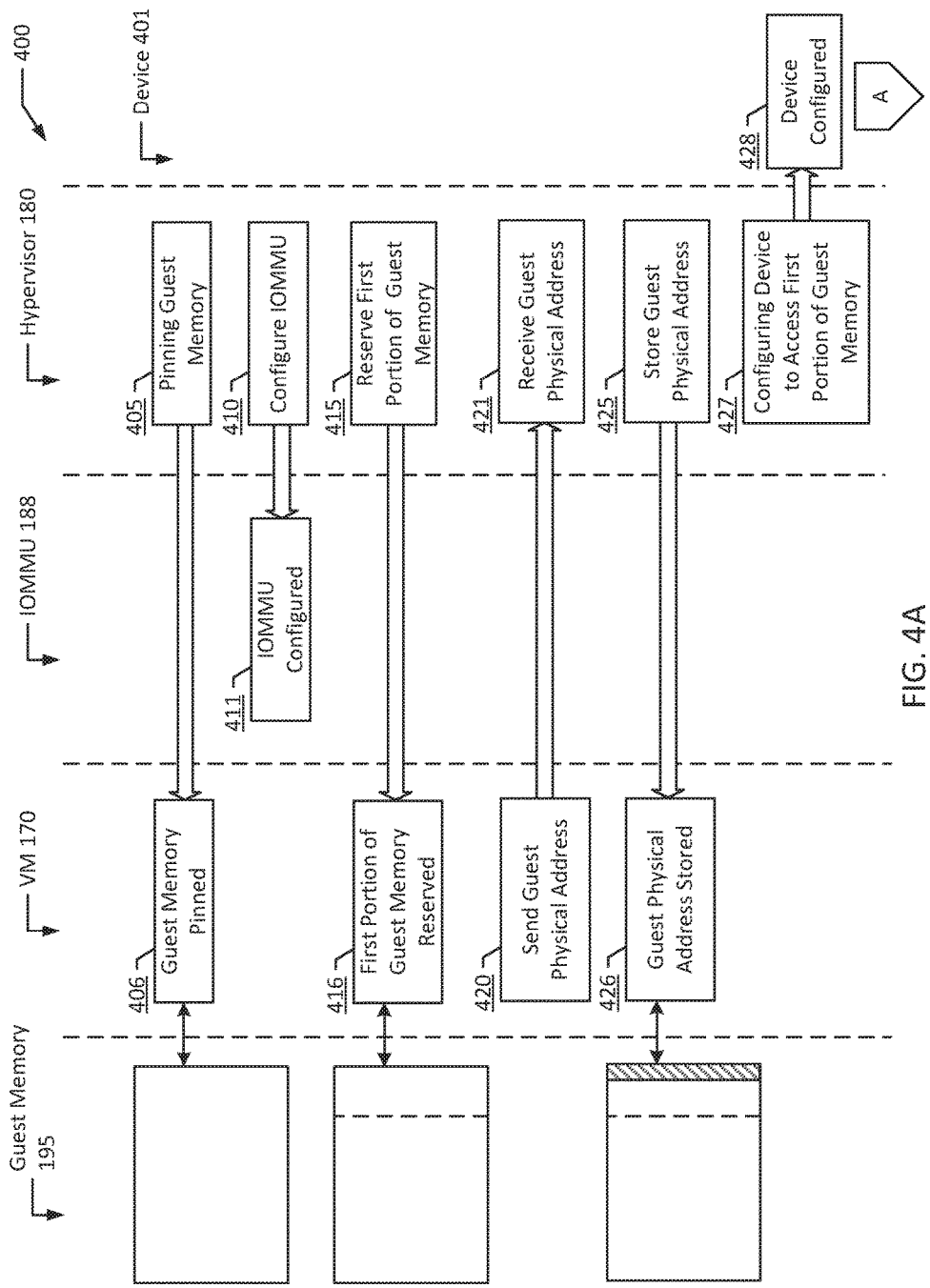
FIGS. 4A-B are flow diagrams illustrating translation bypass according to an example of the present disclosure.
Figure 4B:
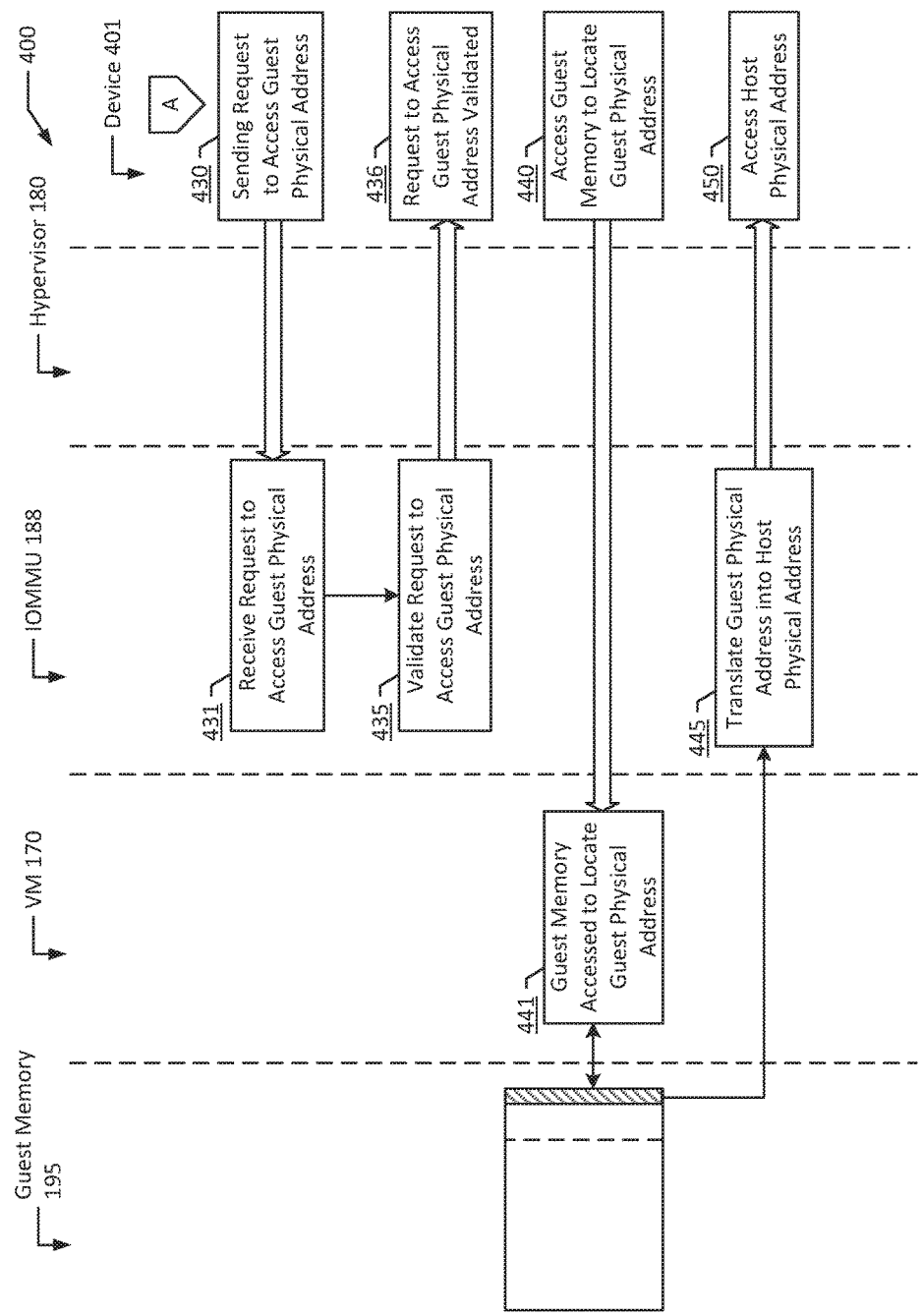

FIGS. 4A-B are flow diagrams illustrating translation bypass according to an example of the present disclosure. Although the example method 400 is described with reference to the flow diagram illustrated in FIGS. 4A-B, it will be appreciated that many other methods of performing the acts associated with the method may be used. For example, the order of some of the blocks may be changed, certain blocks may be combined with other blocks, and some of the blocks described may be optional. The method 400 may be performed by processing logic that may include hardware (circuitry, dedicated logic, etc.), software, or a combination of both. For example, the method 400 may be performed by a hypervisor 180 interacting with guest virtual machine 170, a host input-output memory management unit 188, and a device 401.

In the illustrated example in FIG. 4A, the hypervisor 180 pins guest memory 195 on guest virtual machine 170 (blocks 405 and 406). In an example, by pinning guest memory, the hypervisor 180 configures the guest memory 195 in hypervisor random access memory. The hypervisor 180 also configures the host input-output memory management unit 188 to translate the guest memory 195 of the guest virtual machine 170 (blocks 410 and 411) (e.g., configuring the host input-output memory management unit 188 to translate guest physical addresses to host physical addresses). By configuring input-output memory management unit translation, subsequent hypervisor translation may advantageously be eliminated (e.g., bypassed).

The hypervisor 180 reserves a first portion of guest memory (blocks 415 and 416). For example, the hypervisor reserves the first portion 205 of guest memory 195 on guest virtual machine 170. In an example, the first portion 205 of guest memory 195 is reserved by guest firmware. For example, the first portion 205 of guest memory 195 may be reserved by a guest BIOS (e.g., marking memory reserved at an e820 memory map facility by the guest BIOS). In an example, the first portion 205 of guest memory 195 is protected from guest virtual machine 170 access. For example, guest virtual machine 170 is unable to access any of guest memory 195 within the range defined by the first portion 205.

The guest virtual machine 170 sends guest physical address 210 to the hypervisor 180 (block 420). The hypervisor receives the guest physical address 210 (block 421). The hypervisor 180 stores the guest physical address 210 in the first portion 205 (e.g., the reserved portion) of guest memory 195 (blocks 425 and 426). The hypervisor 180 configures the device 401 to access the first portion 205 (e.g., the reserved portion) of guest memory 195 to locate a command (blocks 427 and 428). For example, the command may include the guest physical address 210. In an example, the command is stored in hypervisor memory 182.

Continuing on to FIG. 4B, the device 401 sends a request to access the command (e.g., the guest physical address 210), such that the request to access the command (e.g., the guest physical address 210) is received by the host input-output memory management unit 188 (blocks 430 and 431). For example, the hypervisor 180 is bypassed and does not receive the request to access the command (e.g. the guest physical address 210). In an example, the device 401 may be any of CPU 120, MD 130, an input/output device, a software device, a hardware device, etc. Responsive to receiving the request to access the command (e.g., the guest physical address 210), the host input-output memory management unit 188 validates the request to access the command (e.g., the guest physical address 210) (blocks 435 and 436). For example, the hypervisor 180 is bypassed and does not validate the request to access the command (e.g., guest physical address 210). For example, the host input-output memory management unit 188 verifies that the guest physical address 210 actually exists in guest memory 195.

Once the request to access has been validated and validation has been received by the device 401, the device 401 may access guest memory 195 to locate the command (e.g., guest physical address 210) (blocks 440 and 441). For example, the device 401 accesses the first portion 205 of guest memory 195 on guest virtual machine 170 to locate the command (e.g., guest physical address 210). In an example, the host input-output memory management unit 188 translates the guest physical address 210 to a host physical address (e.g., an address in host memory 184) (block 445). Responsive to locating the command (e.g., guest physical address 210), the device 401 accesses the command (e.g., accesses the guest physical address 210). In an example, because the guest physical address 201 is translated to a host physical address, by accessing the guest physical address 210 the device 401 accesses the host physical address (e.g., the address in host memory 184) (block 450). In a related example, hypervisor 180 may include a request buffer (e.g., device request buffer 183) stored in memory (e.g., hypervisor memory 182). In an example, access requests (e.g., a request to access a guest physical address) are stored in the request buffer (e.g., device request buffer 183) without any modification, for example, to improve security associated with access requests received from devices.

Additionally, through hypervisor bypass, a guest (e.g., guest virtual machine 170) may be migrated between devices (e.g., CPU 120, MD 130, an input/output device, a software device, a hardware device, etc.), between hosts (e.g., host operating system 186, new host operating system, etc.) or the like, because the guest (e.g., guest virtual machine 170) is not directly linked to a device for access requests; rather, the guest is linked to the hypervisor 180, and access requests are handled by the input-output memory management unit 188. In an example, the guest virtual machine 170 may be migrated to a new host. For example, guest virtual machine 170 is migrated from the host operating system 186 executed by computer system 100 to a new host operating system, such that the guest virtual machine 170 becomes a migrated guest virtual machine. In a related example, the migrated guest virtual machine executes on a new physical machine (e.g., a computer system other than computer system 100). Likewise, in an example, after the guest virtual machine 170 has migrated to a new host, the input-output memory management unit 188 receives, from a device (e.g., CPU 120, MD 130, an input/output device, a software device, a hardware device, etc.), a request to access the guest physical address 210. The device searches the first portion 205 of the guest memory 195 on the migrated guest virtual machine to locate the guest physical address 210. Responsive to locating the guest physical address 210, the device accesses the guest physical address 210 (e.g., virtual machine migration is supported). In a related example, by accessing the guest physical address 210, the device accesses the host physical address as translated by the input-output memory management unit 188.

Figure 5:
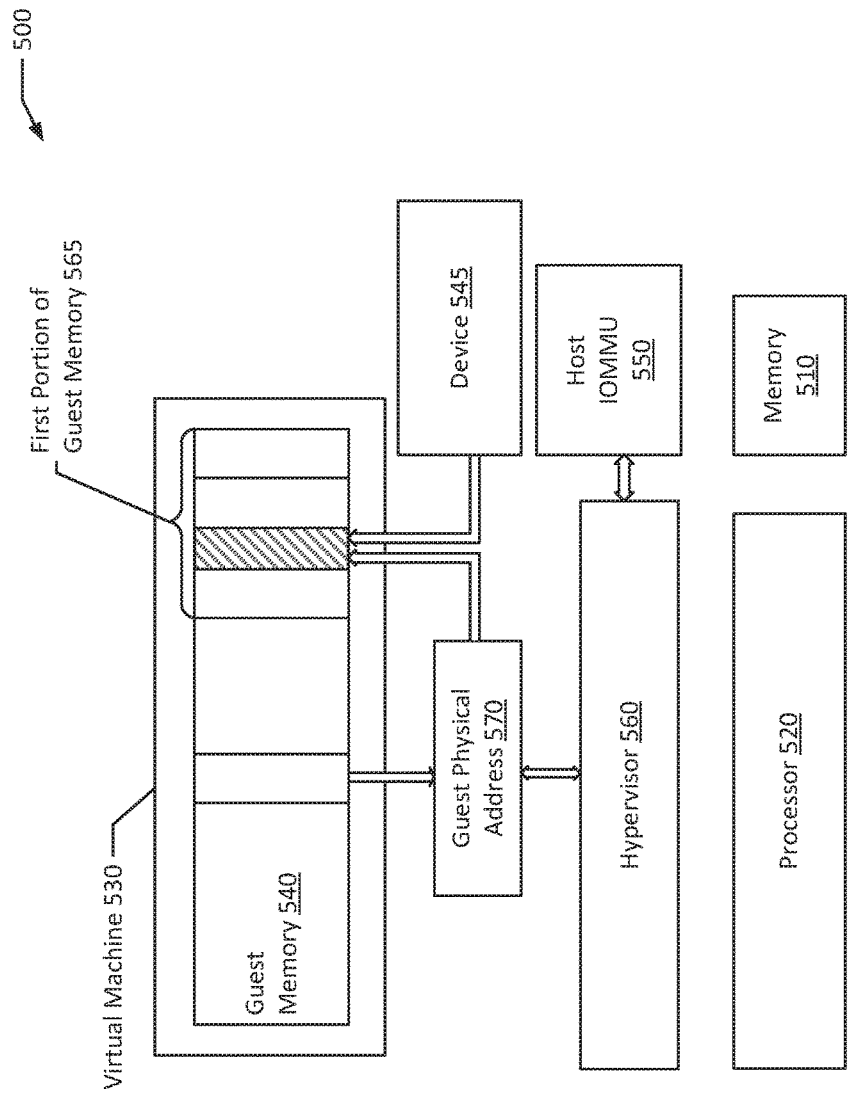
FIG. 5 is a block diagram of an example computer system according to an example of the present disclosure.

FIG. 5 is a block diagram of an example computer system 500 according to an example of the present disclosure. The computer system 500 may include a memory 510 and a processor 520 in communication with the memory 510. The computer system 500 may further include a virtual machine 530 executing on the processor 520. The virtual machine 530 may include a guest memory 540. The computer system 500 may further include a device 545. The computer system 500 may further include a host input-output memory management unit 550 (host IOMMU). The computer system 500 may also include a hypervisor 560 executing on the processor 520. The hypervisor 560 configures the host input-output memory management unit 550 to translate the guest memory 540 of the virtual machine 530 (e.g., translate guest addresses to host addresses). In an example, prior to configuring the host input-output memory management unit 550, the hypervisor 560 pins the guest memory 540 (e.g., configures the guest memory 540 in hypervisor random access memory).

The hypervisor 560 reserves a first portion of guest memory 565 (e.g., a range of guest physical addresses in guest memory 540). In an example, the first portion of guest memory 565 is reserved by guest firmware. In an example, the first portion of guest memory 565 is protected from virtual machine access (e.g., virtual machine 530 is unable to access any of guest memory 540 within the range defined by the first portion of guest memory 565). The hypervisor 560 receives, from the virtual machine 530, a guest physical address 570 (e.g., an address in guest memory 540). The hypervisor 560 stores the guest physical address 570 in the first portion of guest memory 565 (e.g., within the reserved range of guest physical addresses in guest memory 540). The hypervisor 560 configures the device 545 to access the first portion of guest memory 565 to locate a command. In an example, the command includes the guest physical address 570. Accordingly, example computer system 500 may advantageously reduce overhead and increase efficiency of network function virtualization applications.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures. It should also be noted that a hypervisor may be referred to differently in various systems, for example, as a virtual machine monitor. Any program or component performing steps of the hypervisor as described herein may be a hypervisor in accordance with the present disclosure.

It should be understood that various changes and modifications to the examples described herein are apparent. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
    configuring, by a hypervisor, a host input-output memory management unit to translate a guest memory of a guest virtual machine, wherein the guest memory is allocated to a guest operating system of the guest virtual machine;

reserving, by the hypervisor, a first portion of the guest memory;

receiving, by the hypervisor from the guest virtual machine, a guest physical address;

storing, by the hypervisor, the guest physical address in the first portion of the guest memory; and configuring, by the hypervisor, a device to access the first portion of the guest memory to locate a command.

2. The method of claim 1, further comprising pinning, by the hypervisor, the guest memory.

3. The method of claim 2, wherein pinning the guest memory includes configuring the guest memory in hypervisor random access memory.

4. The method of claim 1, further comprising:

receiving, by the host input-output memory management unit, from the device, a request to access the command; and accessing, by the device, the first portion of the guest memory to locate the command.

5. The method of claim 4, wherein the host input-output memory management unit validates the request to access the command.

6. The method of claim 4, wherein the command includes the guest physical address.

7. The method of claim 6, further comprising, responsive to locating the command, accessing, by the device, the guest physical address.

8. The method of claim 7, further comprising translating, by the host input-output memory management unit, the guest physical address to a host physical address, such that the device accesses the host physical address.

9. The method of claim 1, wherein the first portion of the guest memory is reserved by guest firmware.

10. The method of claim 1, wherein the first portion of the guest memory is protected from guest virtual machine access.

11. The method of claim 1, further comprising storing the command in a hypervisor memory.

12. The method of claim 1, wherein the hypervisor includes a device specific driver.

13. The method of claim 1, wherein the guest virtual machine includes a generic driver.

14. A system comprising:

a memory;

one or more processors, in communication with the memory;

a device;

a virtual machine to execute on the one or more processors, the virtual machine including a guest memory;

a host input-output memory management unit; and a hypervisor to execute on the one or more processors to:

configure the host input-output memory management unit to translate the guest memory of the virtual machine, wherein the guest memory is allocated to a guest operating system of the virtual machine, reserve a first portion of the guest memory, receive, from the virtual machine, a guest physical address, store the guest physical address in the first portion of the guest memory; and configure the device to access the first portion of the guest memory to locate a command.

15. The system of claim 14, wherein the hypervisor pins the guest memory.

16. The system of claim 15, wherein pinning the guest memory includes configuring the guest memory in hypervisor random access memory.

17. The system of claim 14, wherein the host input-output memory management unit receives, from the device, a request to access the command, wherein the device accesses the first portion of the guest memory to locate the command, wherein the command includes the guest physical address, and wherein, responsive to locating the command, the device accesses the guest physical address.

18. The system of claim 14, wherein the first portion of the guest memory is reserved by guest firmware.

19. The system of claim 14, wherein the first portion of the guest memory is protected from virtual machine access.

20. A computer-readable non-transitory storage medium comprising executable instructions that, when executed, cause a hypervisor to:

configure a host input-output memory management unit to translate a guest memory of a guest virtual machine, wherein the guest memory is allocated to a guest operating system of the guest virtual machine;

reserve a first portion of the guest memory;

receive, from the guest virtual machine, a guest physical address;

store the guest physical address in the first portion of the guest memory; and configure a device to access the first portion of the guest memory to locate a command.

* * * * *